US008548947B2

(12) United States Patent
Robinson

(10) Patent No.: US 8,548,947 B2
(45) Date of Patent: Oct. 1, 2013

(54) SYSTEMS AND METHODS FOR FILE MAINTENANCE

(75) Inventor: Doublas B. Robinson, Hollis, NH (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1682 days.

(21) Appl. No.: 11/413,534

(22) Filed: Apr. 28, 2006

(65) Prior Publication Data
US 2007/0255765 A1  Nov. 1, 2007

(51) Int. Cl.
*G06F 7/00* (2006.01)

(52) U.S. Cl.
USPC .......................................................... 707/638

(58) Field of Classification Search
USPC ................. 707/100–103, 203, 205, 638, 690, 707/695, 999.203
See application file for complete search history.

(56) References Cited

U.S. PATENT DOCUMENTS

| 4,205,371 A * | 5/1980 | Feather ........................ 707/101 |
| 4,558,413 A * | 12/1985 | Schmidt et al. ............... 707/203 |
| 4,809,170 A * | 2/1989 | Leblang et al. ............... 717/122 |
| 4,912,637 A * | 3/1990 | Sheedy et al. ................ 707/203 |
| 5,005,119 A * | 4/1991 | Rumbaugh et al. ........... 718/101 |
| 5,278,979 A * | 1/1994 | Foster et al. .................. 707/203 |
| 5,339,435 A * | 8/1994 | Lubkin et al. ................. 717/121 |
| 5,574,898 A * | 11/1996 | Leblang et al. .................. 707/1 |
| 5,649,200 A * | 7/1997 | Leblang et al. ............... 717/122 |
| 5,675,802 A * | 10/1997 | Allen et al. ................... 717/103 |
| 5,692,178 A * | 11/1997 | Shaughnessy .................... 707/8 |
| 5,881,292 A * | 3/1999 | Sigal et al. ................... 717/170 |
| 6,694,328 B1 * | 2/2004 | Bennett .................... 707/103 R |
| 6,757,893 B1 * | 6/2004 | Haikin ......................... 717/170 |
| 6,766,334 B1 * | 7/2004 | Kaler et al. ................... 707/203 |
| 7,076,496 B1 * | 7/2006 | Ruizandrade ................. 707/102 |
| 7,251,655 B2 * | 7/2007 | Kaler et al. ...................... 707/9 |
| 7,257,711 B2 * | 8/2007 | Goodrich et al. ............. 713/176 |
| 7,331,034 B2 * | 2/2008 | Anderson ..................... 717/103 |
| 2002/0152194 A1 * | 10/2002 | Sathyanarayan ................ 707/1 |
| 2005/0226597 A1 * | 10/2005 | Cobb et al. ..................... 386/52 |
| 2006/0242673 A1 * | 10/2006 | Kondo et al. ................... 725/89 |
| 2007/0027927 A1 * | 2/2007 | Theis ........................... 707/200 |

FOREIGN PATENT DOCUMENTS

GB   2388212 A  * 11/2003

OTHER PUBLICATIONS

Munirul Islam and Eugene P. Bordelon, CCMS: A geographically Distributed ConCurrent Change and Configuration Management System, 2003, Lucent Technologies Inc. 111-133.*
Larry Allen, Gary Fernandez, Kenneth Kane, David Leblang, Debra Minard, John Posner, Clearcase Multisite: Supporting Geographically-Distributed Software Development, 1995, vol. 1005, 194-214.*
Reidar Conradi and Bernhard Westfechtel, Version Models for Software Configuration Management, Jun. 1998, vol. 30, No. 2, 232-282.*

* cited by examiner

Primary Examiner — Mohammed R Uddin

(57) ABSTRACT

Systems and methods are disclosed that collect information for entries in a list. Multiple versions of the entries are maintained in a version object base. The elements are determined to be removable based on whether the elements are private versions or master versions.

15 Claims, 2 Drawing Sheets

SYSTEMS AND METHODS FOR FILE MAINTENANCE

BACKGROUND

Software development can involve multiple developers and/or groups of developers working on various aspects of a software product. Changes made by the developers can result in new versions corresponding to the evolution of the software product. These versions can be associated with directories and files relating to various components of the software product.

Source control management (SCM) products attempt to track and coordinate the work of the developers in creating new versions of the software product. Various SCM products, such as RATIONAL® CLEARCASE® by International Business Machines of Armonk, N.Y., are available to aid in basic source control management. SCM products can work in conjunction with a software development methodology to create a record of activity related to the software product. The SCM products may also limit access to specific versions of the software to prevent multiple parties from simultaneously making changes to a given version of any file or directory element that comprises the software product.

During software development, modules are typically created in tree-like fashion where multiple branches develop from a central trunk or branch and the branches themselves tend to branch again. SCM or versioning trees are distinct and separate from the file system directory tree. A version tree can comprise some or all of the directories and/or files associated with a given component of the software product. SCM products can preserve data associated with versions of components of the software product. A given component begins with a central branch or trunk comprising a directory. A given version begins with a central branch or trunk comprising versions of files and directories in the file system. New versions associated with a directory produce additional branching of both the version tree and the file system directory tree. Such a configuration can represent the recursive development process associated with a software product since directory versions located on an external or secondary portion of a version branch are inherently derived from, and subsequent to, a directory version located on a central or primary portion of the version branch.

In the ClearCase environment, a file system directory tree can comprise a version object base (VOB). A VOB is a single database of entries. Starting at a root element of version zero, which can correspond to the base of the metaphorical trunk or main branch, each branch in the version tree can correspond to a new directory in the file system tree.

The "lost+found" directory in a typical file system is a location for an operating system such as UNIX or WINDOWS® to create or relocate files or data that are identified as corrupt (in UNIX) or are found to have other internal integrity issues. A system administrator can remove entries from an operating system's lost+found directory during a normal system cleanup process.

ClearCase provides a Version Object Base (VOB) lost+found directory that represents a unique boundary between an operating system's file system and a ClearCase VOB's multi-versioned file system.

Removing ClearCase entries from a VOB's lost+found directory involves choices and decisions that challenge even expert system administrators, especially in IBM MultiSite environments. Additional program policies and procedures from other products imposed on top of the ClearCase product can add further complexity to the cleanup decision process. When a directory element is removed, zero or more elements may be added to the VOB's lost+found directory as a result and, for the purposes of this disclosure, any elements so added are referred to as "fallout elements."

SUMMARY

Systems and methods are disclosed that collect information for entries in a list. Multiple versions of the entries are maintained in a version object base. Elements corresponding to the entries are determined to be removable based on whether the elements are private versions or master versions.

BRIEF DESCRIPTION OF THE DRAWINGS

The accompanying drawings, which are incorporated in and form a part of this specification, illustrate embodiments of the invention and, together with the description, serve to explain its principles.

DETAILED DESCRIPTION OF THE DRAWINGS

Figure 1:
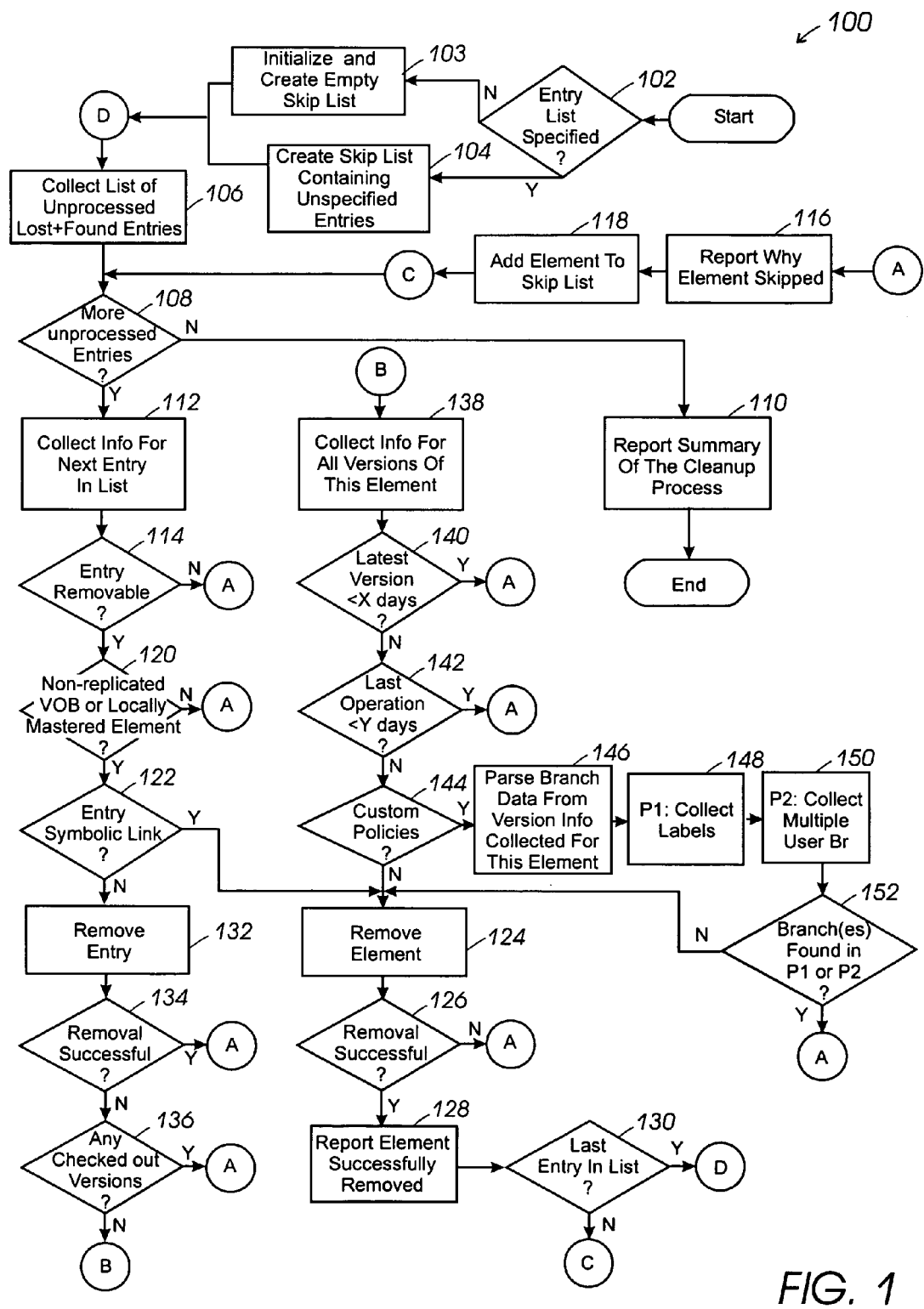
FIG. 1 shows a flow diagram of an embodiment of a process for removing items from a lost+found directory in which a configuration and life cycle management system is used.

Systems and methods for removing elements in a lost+found directory, and in replica lost+found directories in multi-site environments, are disclosed. Such systems and methods help prevent extraneous files from causing operational bottlenecks in computer systems that include multiple versions of software files created by configuration control and life cycle management systems such as Rational® ClearCase® by International Business Machines (IBM). The clean-up process typically removes extraneous files automatically and provides a report indicating files that were removed. In some embodiments, an explanation can be provided when an element can not be removed to enable a system administrator to complete the clean-up process manually, if necessary. The process can also take into account custom software development policies and procedures in removing elements.

Many computer file systems include a hierarchical directory structure. One or more files and/or sub-directories can be stored in each of the directories. Directories and files are referred to herein as "elements." Elements under version control in systems such as ClearCase are stored with their histories in repositories called Versioned Object Bases (VOBs), also referred to herein as version controlled directories. In a system in which a configuration control system is implemented, zero or more elements may be added to the VOB's lost+found directory when a directory element is removed. It is not possible to determine in advance which elements within a sub-directory, if any, will be placed back in the VOB lost+found directory. The ClearCase system makes this determination as each sub-directory element is removed from the lost+found directory.

VOBs can be used to provide dynamic views of a consistent set of versions that map to a software configuration. ClearCase also supports snapshot views, which are copies of a directory tree spanning one or more VOBs. Snapshot views do not use a virtual file system to provide access to VOB data. Instead, a snapshot view stores a copy of the VOB data locally on a user's computer. Snapshot views can be used while disconnected from the network and later resynchronized to the VOB when a connection is reestablished.

From the perspective of software on the client computer, a view appears as another file system. If an element is created in a view using certain commands such as copying or saving from an editor, then ClearCase will create this file as a "view-private" file. View-private files are not visible in any other view. This allows build systems to operate in the same directory structure as the source code, and ensures that each developer can build independently of each other. A view-private file can be converted into a versioned element at any time, making it visible to other developers.

Each developer typically has one or several views at his disposal. It is sometimes practical to share views between developers, but sharing branches is usually used instead. Having a branch hierarchy is often useful, so an entire development project can share a common development branch, while a smaller team shares a sub-branch, and each developer has his or her private branch. Whenever some change is deemed stable enough for a larger group, it can be merged to the parent branch.

Referring to FIG. 1, a flow diagram of an embodiment of a clean-up process 100 for removing elements found in a lost+found directory and in replica lost+found directories in multi-site environments is shown. Process 100 iteratively examines a list of elements in a lost+found directory and safely removes those element(s) in accordance with safety rules for a standardized configuration control and life cycle management system, as well as custom policy rules. Policy Enforcement Agents (PEAs) are sets of wrapper scripts or triggers that enforce the processes and policies typically specified by the business doing the development. Some PEAs are developed directly on top of configuration management tools (e.g. ClearCase). Some PEAs are supplied by vendors, such as the UCM optional layer to ClearCase from IBM Rational. In other cases, PEAs are developed for internal use within organizations.

Interactive Development Environments (IDE) with collaborative capabilities aid coordination and communication among developers. Examples of IDE's that can be used include the Java IDE, Visual Basic IDE, and the Visual C++ IDE, among others. A configuration management tool such as ClearCase and a PEA can typically integrate with an IDE.

ClearCase stores UCM metadata in a specialized VOB called a project (VOB). The scope of a UCM project is declared in terms of component (VOBs). A project must contain at least one component and can share components. ClearCase uses an AdminVOB hyperlink to associate component VOBs to a project VOB.

Process 102 can include an initialization phase that determines items such as where a current VOB is replicated, whether an "entry list" was provided via a command line used to invoke process 100, whether custom policies and rules apply to the current VOB, and whether the current VOB has an AdminVOB hyperlink, among others. The entry list can include names of elements in a lost+found directory.

During initialization, a "Skip List" can be generated to ignore elements that were previously processed and determined to be non-removable from a VOB replica. Two lists of lost+found entries can be created. The Skip List can be initialized at the start and added to during processing. An "Unprocessed Entry List" can be recreated for each iteration of the cleanup process to facilitate the cleanup of "fallout elements".

When no initial list of entries is provided, the Skip List can be initialized as empty in process 103. When an initial list is provided, the Skip List can be initialized to be all other entries in lost+found in process 104. This allows for easily determining, and processing, any of the "fallout entries" that may be added during cleanup.

Processes 106 through 152 are performed until no further unprocessed elements are found in the lost+found directory. Process 106 can collect a list of unprocessed elements and display a count of "candidates for removal." If an "entry list" was specified in the command line, the list can be either the original list (first time through) or any "fallout" elements added to the lost+found directory due to the removal of one or more elements in a given iteration. If an entry list was not specified in the command line, the list can be created by excluding from the list any elements in the lost+found directory that have already been processed.

Process 108 determines whether there are more entries in the list of unprocessed elements. If not, process 110 generates a report summary of the cleanup process for the user. Otherwise, process 112 collects information for the next entry in the list. For example, a system implemented in ClearCase can use "cleartool describe", retrieve "element type", and "element master_replica" attributes to collect information.

Process 114 determines whether the element is removable. For example, in ClearCase, process 114 can determine whether the element is a "view private" file (and therefore not removable). If the element is not removable, the entry is skipped and control transitions to process 116 (branch A), which generates a report indicating that the entry was skipped because the associated element could not be removed. For example, in the ClearCase system, process 116 will report that "view-private" files could not be removed in process 114. The report may also include the type of element (e.g., file directory, etc.) and other relevant information. Process 118 adds the entry to the skip list and control transitions to process 108 to process the next remaining entry in the skip list.

If process 114 determines that the element is removable, process 120 determines whether the element is a locally mastered element. Mastership of elements is critical in replicated ClearCase VOBs and not a consideration in non-replicated ClearCase VOBs. In replicated VOBs, every element has a master VOB replica. Elements can only be removed at the VOB replica where they are mastered. In the case of a non-replicated VOB mastership is not a consideration and are treated as if they were locally mastered. All non-locally mastered elements are skipped. Accordingly, if an element is not locally mastered, as determined in process 120, process 116 will report where the master version of the element resides and process 118 adds the entry to the skip list.

If process 120 determines that the element is a locally mastered version on the system, then process 122 determines whether the element is a symbolic link of an element as opposed to a hard link. A symbolic link is a directory entry that contains a character string specifying a full or relative pathname. The link acts as a pointer to a file, a directory, or another symbolic link. A hard link is a directory entry that provides an alternative name for an existing file. The file's "original" name and hard links are equivalent. ClearCase supports VOB hard links and VOB symbolic links. A VOB hard link is a directory entry that provides an additional name for an existing element in the same VOB. A VOB symbolic link is an object whose content is a character string that specifies a pathname. A pathname is made up of either VOB hard links to elements or symbolic links and can specify a location in the same VOB, in a different VOB, or a non-VOB location. VOB symbolic links do not have version trees since they do not name elements. Version-control of VOB symbolic links is accomplished through directory versioning.

If the element is determined to be a symbolic link in process 122, the element is deleted in process 124 using a suitable command, such as the "rmelem" command in the UNIX operating system. Process 126 determines whether the element was successfully removed. If so, process 128 includes information regarding the successful removal of the element in a report, otherwise process 116 will report why the element could not be removed and process 118 adds the element to the skip list.

Process 130 determines whether the last element in the skip list has been processed. If not, control passes to process 108, which is further described hereinabove. If the last element in the list has been processed, control passes to process 106, which collects a list of unprocessed elements in the lost+found directory.

Referring again to process 122, if an element is not a symbolic link, the element is deleted in process 132 using a suitable operating system command, such as the "rmname" command in the UNIX operating system. Process 134 determines whether the element was successfully removed. If so, process 116 will report why the element could not be removed and process 118 adds a corresponding entry to the skip list. If not, process 136 determines whether there are any versions of the element that have been checked out. If versions of the element have been checked out, then control passes to process 116, which reports why the element could not be removed. In some implementations, process 116 reports "user", "view" and "master_replica" information for each "branch/instance" path of the checked out versions. Process 118 adds the entry to the skip list and control passes to process 108 to process the next entry in the list.

If process 136 determines there are no versions of the element that have been checked out, process 138 collects information for all versions of the element. For example, in a ClearCase environment, information regarding all versions of the element can be obtained using the ClearCase command "cleartool lsvtree-a-obs".

Process 140 determines whether the version of the element was created less than a specified amount of time ago. For example, in some implementations, if an element is less than 30 days old, then it is considered too recently created to be removed. If the creation date of an element is within the specified threshold, then control passes to process 116, which reports that the element could not be removed because the element is a recently created version. Process 118 adds the entry to the skip list and control passes to process 108 to handle the next entry in the list.

Process 142 determines whether the last operation on or use of the element occurred less than a specified amount of time ago. For example, in some implementations, if an element was used or accessed less than 30 days ago, then it is considered too current to be removed. If the last operation or access date of an element is within the specified threshold, then control passes to process 116, which reports that the element could not be removed because the element was recently used or accessed. Process 118 adds an entry for the element to the skip list and control passes to process 108 to handle the next entry in the list.

In some embodiments, custom element retention policies may be implemented. For example, a PEA implementation may allow administrators to implement custom element retention policies for element branches. Process 144 can be included to determine whether custom policies are implemented. If so, process 146 parses the element version information collected in process 138 to determine the number of task branches that exist for the element.

In a system implemented with ClearCase, branch/version information for file versions with non-zero size can be determined from a Control VOB created according to a PEA implementation. Note that "main/" and "version 0" branches in the Control VOB can be ignored. For each leaf branch, the command "cleartool describe brtype:branchtypename@VobTag" (attribute: "brtype VS" indicates User Task Br) can be used to parse the branch data.

Process 148 can include collecting all label names on any version. An integration branch is a branch where all the work done on a project is collected and includes the elements from all developers on the project. Labels are collected for elements on integration branches, including any integration branch (Non-User) version that is LABELED, and any integration branch (Non-User) with a NON-ZERO version.

Process 150 collects information for branches with multiple users. For example, in systems implemented with ClearCase, information is collected for any element with more than one "USER" branch.

Process 152 determines whether any branch data was collected in processes 148 or 150. If so, control passes to process 116, which reports that the element was skipped and the reason why the element was not removed. Process 118 adds an entry for the element to the skip list, and control passes to process 108, which begins handling the next entry on the skip list. If branch data was not collected in processes 148 or 150, then control passes to processes 124 through 130, which are further described elsewhere herein.

Note that bypass logic (not shown) can be included to disable execution of any of processes 140, 142, 144, and/or other suitable processes. For example, after process 142, the bypass logic can determine whether to include checking for custom policies in process 144. If not, then process 142 can transition directly to process 124, thereby skipping process 144.

Figure 2:
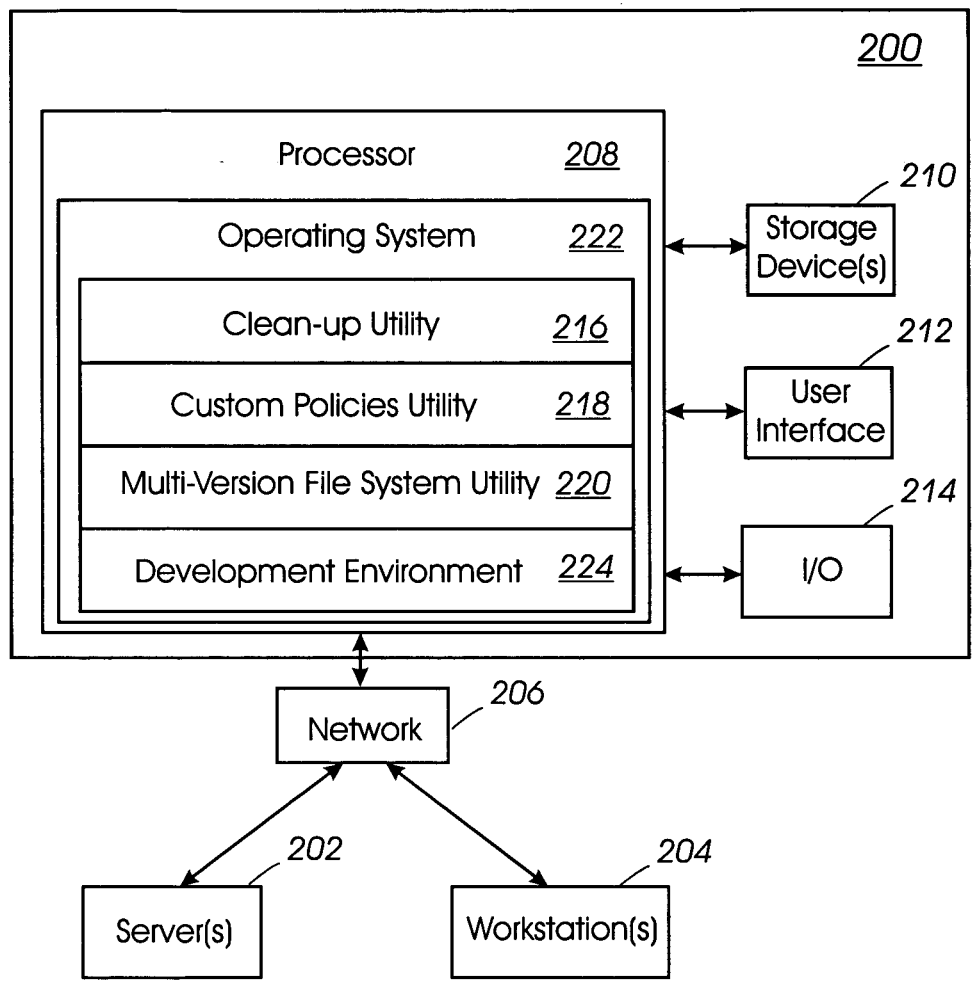
FIG. 2 shows an embodiment of a computer system in which the process shown in FIG. 1 can be implemented.

FIG. 2 shows a diagram of a typical, general purpose computer system 200 suitable for implementing some embodiments of the present invention. Embodiments disclosed herein may be implemented in a variety of computer system configurations such as servers 202 and/or workstations 204. Any suitable computer systems can be used, such as personal computers, hand-held devices, multi-processor systems, microprocessor-based or programmable consumer electronics, network PCs, network adapters, minicomputers, mainframe computers and the like. Embodiments of the invention may also be practiced in distributed computing environments, where tasks are performed by remote processing devices, such as server(s) 202 and/or workstations 204 that are linked through a communications network 206 such as the Internet. In a distributed computing environment, program modules may be located in both local and remote memory storage devices. Additionally, some embodiments may be implemented as logic instructions and distributed on computer readable media or via electronic signals.

Computer system 200 can include any number of processors 208 configured to communicate with one or more storage devices 210 such as a random access memory (RAM), read only memory (ROM), a CD-ROM, and/or magnetic disk drive. Processor 208 can also communicate with user interface 212, which allows a user to enter data and commands, and view information. Processor 208 and user interface 212 can be configured to use one or more input/output (I/O) devices 214 that may include, but are not limited to, devices such as video monitors, track balls, mice, keyboards, microphones, touch-sensitive displays, transducer card readers, magnetic or paper tape readers, tablets, styluses, voice or handwriting recognition systems, and/or other suitable types of devices. Processor 208 optionally may be coupled to a computer or telecommunications network 206, e.g., a local area network and/or a wide area network such as the Internet. With such a network connection, processor 208 can receive information from the network 206, or output information to the network 206 in the course of performing all or portions of process 100 (FIG. 1). Such information, which can be represented as a sequence of instructions to be executed using processor 208, may be received from and output to the network 206, for example, in the form of a computer data signal embodied in a carrier wave.

The embodiment of processor 208 shown is configured to execute several logic modules including clean-up utility 216, custom policies utility 218, multi-version file system utility 220, operating system 222, and an interactive development environment (IDE) 224. An example of clean-up utility 216 that can be used is process 100 (FIG. 1), which allows an administrator to clear unused elements from directories even when multi-version file system utility 220, such as ClearCase, and custom policies utility 218 that provides system-specific rules for element retention, are implemented.

Operating system 222 can be the UNIX, LINUX, Windows, or other suitable operating system that is capable of supporting processor 208, interfacing with network 206, storage devices 210, user interface 212, and I/O devices 214, and executing logic modules, such as clean-up utility 216, custom policies utility 218, multi-version file system utility 220, and IDE 224.

Examples of IDE's 224 that can be used in system 200 include the Java IDE, Visual Basic IDE, and the Visual C++ IDE, among others. IDE 224 can include software development tools such as a syntax-directed editor, graphical tools for program entry, and integrated support for compiling and running the program and relating compilation errors back to the source. An IDE 224 typically allows a developer to view and alter execution of a program at the level of statements and variables.

The logic modules, processing systems, and circuitry described herein may be implemented using any suitable combination of hardware, software, and/or firmware, such as Field Programmable Gate Arrays (FPGAs), Application Specific Integrated Circuit (ASICs), or other suitable devices. The logic modules can be independently implemented or included in one of the other system components. Similarly, other components are disclosed herein as separate and discrete components. These components may, however, be combined to form larger or different software modules, logic modules, integrated circuits, or electrical assemblies, if desired.

While the present disclosure describes various embodiments, these embodiments are to be understood as illustrative and do not limit the claim scope. Many variations, modifications, additions and improvements of the described embodiments are possible. For example, those having ordinary skill in the art will readily implement the processes necessary to provide the structures and methods disclosed herein. Variations and modifications of the embodiments disclosed herein may also be made while remaining within the scope of the following claims. The functionality and combinations of functionality of the individual modules can be any appropriate functionality. In the claims, unless otherwise indicated the article "a" is to refer to "one or more than one".

What is claimed:

1. An apparatus comprising:
  computer-executable logic instructions embedded on non-transitory computer-readable media and operable to:
    collect information for element entries in a list, wherein multiple versions of elements are maintained in a version object base;
    determine whether the elements are removable based on whether the elements are at least one of the group of: private files and locally mastered elements;
    skip elements that are not removable; and
    at least one of:
      select between different removal procedures based on whether the entry is a Version Object Base (VOB) symbolic link entry; and
      skip removal of elements and VOB symbolic link entries associated with elements that are not locally mastered.

2. The apparatus of claim 1, wherein the entries in the list are associated with elements that reside in a lost+found directory.

3. The apparatus of claim 1, further comprising:
  logic instructions operable to:
    generate a report indicating whether the elements were removed.

4. The apparatus of claim 1, further comprising:
  logic instructions operable to:
    determine whether any versions of the elements are checked-out.

5. The apparatus of claim 1, further comprising:
  logic instructions operable to:
    determine whether the elements were created within a specified period of time.

6. The apparatus of claim 1, further comprising:
  logic instructions operable to:
    determine whether the last operation on the elements occurred less than a specified amount of time ago.

7. The apparatus of claim 1, further comprising:
  logic instructions operable to:
    determine whether custom policies are implemented.

8. The apparatus of claim 7, further comprising:
  logic instructions operable to:
    determine the number of task branches that exist for the elements;
    remove the elements that are not associated with the task branches; and
    skip the entries for the elements that are associated with the task branches.

9. A method comprising:
  removing an element from a version object base (VOB) in a computer system, wherein more than one version of the element can exist, and removal of the element is based on whether the element is a View private file and at least one of the group of: whether the element is a master version and whether there are any versions of the element currently checked-out.

10. The method of claim 9, further comprising:
  reporting whether the element was removed.

11. The method of claim 9, further comprising:
  determining how to remove the element based on whether an entry for the element is a symbolic link.

12. The method of claim 9, further comprising:
  determining whether to remove the element based on the age of the element.

13. The method of claim 9, further comprising:
  determining whether to remove the element based on the amount of time since the element was last accessed.

14. The method of claim 9, further comprising:
  determining whether the element has multiple versions; and
  collecting information for the multiple versions; and
  deleting the multiple versions.

15. An apparatus comprising:
  computer-executable logic instructions embedded on non-transitory computer-readable media and operable to:
    collect information for element entries in a list, wherein multiple versions of elements are maintained in a version object base;

determine whether the elements are removable based on whether the elements are private files;

when the elements are removable, determine whether the elements are at least one of the group of: non-replicated and locally mastered elements;

remove the elements that are removable and are at least one of the group of:

non-replicated and locally mastered elements; and skip elements that are not removable.

* * * * *

UNITED STATES PATENT AND TRADEMARK OFFICE
CERTIFICATE OF CORRECTION

| | | |
|---|---|---|
| PATENT NO. | : 8,548,947 B2 | Page 1 of 1 |
| APPLICATION NO. | : 11/413534 | |
| DATED | : October 1, 2013 | |
| INVENTOR(S) | : Douglas B. Robinson | |

It is certified that error appears in the above-identified patent and that said Letters Patent is hereby corrected as shown below:

On the title page, item (75), Inventors, in column 1, line 1, delete "Doublas" and insert -- Douglas --, therefor.

Signed and Sealed this
Fourth Day of February, 2014

Michelle K. Lee
*Deputy Director of the United States Patent and Trademark Office*